United States Patent
Kang et al.

(10) Patent No.: US 9,873,622 B2
(45) Date of Patent: Jan. 23, 2018

(54) HYBRID POROUS STRUCTURED MATERIAL, MEMBRANE INCLUDING THE SAME, AND METHOD OF PREPARING HYBRID POROUS STRUCTURED MATERIAL

(71) Applicant: Samsung Electronics Co., Ltd., Suwon-Si Gyeonggi-Do (KR)

(72) Inventors: Hyo Kang, Seoul (KR); Sung Soo Han, Hwaseong-si (KR); Pil Jin Yoo, Seoul (KR); Du-yeol Ryu, Goyang-si (KR); Young Hun Kim, Suwon-si (KR); Seon Ju Yeo, Gyeongsan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 566 days.

(21) Appl. No.: 14/061,203

(22) Filed: Oct. 23, 2013

(65) Prior Publication Data

US 2014/0048477 A1    Feb. 20, 2014

Related U.S. Application Data

(63) Continuation-in-part of application No. 13/469,858, filed on May 11, 2012.

(30) Foreign Application Priority Data

Nov. 4, 2011 (KR) .................. 10-2011-0114745
Feb. 22, 2013 (KR) .................. 10-2013-0018973

(51) Int. Cl.
B29C 67/20 (2006.01)
C02F 1/44 (2006.01)
(Continued)

(52) U.S. Cl.
CPC ............ C02F 1/44 (2013.01); B01D 67/003 (2013.01); B01D 67/0006 (2013.01);
(Continued)

(58) Field of Classification Search
CPC ....... C02F 1/44; B01D 71/028; B01D 71/024; B01D 67/0079; B01D 69/10;
(Continued)

(56) References Cited

U.S. PATENT DOCUMENTS

| 4,105,426 A | 8/1978 | Iler et al. |
| 6,261,469 B1 | 7/2001 | Zakhidov et al. |

(Continued)

FOREIGN PATENT DOCUMENTS

| KR | 100764826 B1 | 10/2007 |
| KR | 100805303 B1 | 2/2008 |

(Continued)

OTHER PUBLICATIONS

H. Uehara et al., Size-Selective Diffusion in Nanoporous but Flexible Membranes for Glucose Sensors, ACS Nano 2009 3 (4), 924-932, DOI: 10.1021/nn8008728.*

(Continued)

Primary Examiner — Lucas Stelling
Assistant Examiner — Angel Olivera
(74) Attorney, Agent, or Firm — Harness, Dickey & Pierce

(57) ABSTRACT

A hybrid porous structured material may include a matrix including a plurality of first pores interconnected in three dimensions, and a porous material including second pores and filling wholly or partially each of the plurality of first pores.

11 Claims, 11 Drawing Sheets

(51) Int. Cl.

| | |
|---|---|
| *B01D 67/00* | (2006.01) |
| *B01D 69/02* | (2006.01) |
| *B01D 69/10* | (2006.01) |
| *B01D 69/12* | (2006.01) |
| *B01D 69/14* | (2006.01) |
| *B01D 71/02* | (2006.01) |
| *B01D 71/80* | (2006.01) |

(52) U.S. Cl.
CPC ..... *B01D 67/0079* (2013.01); *B01D 67/0088* (2013.01); *B01D 67/0093* (2013.01); *B01D 69/02* (2013.01); *B01D 69/10* (2013.01); *B01D 69/12* (2013.01); *B01D 69/125* (2013.01); *B01D 69/148* (2013.01); *B01D 71/021* (2013.01); *B01D 71/024* (2013.01); *B01D 71/028* (2013.01); *B01D 71/80* (2013.01); *B29C 67/202* (2013.01); *B01D 67/0009* (2013.01); *B01D 67/0058* (2013.01); *B01D 2323/28* (2013.01); *B01D 2323/283* (2013.01); *B01D 2323/46* (2013.01); *B01D 2325/021* (2013.01); *B01D 2325/08* (2013.01); *B01D 2325/12* (2013.01); *B01D 2325/24* (2013.01)

(58) Field of Classification Search
CPC .... B01D 67/003; B01D 69/148; B01D 69/02; B01D 71/021; B01D 71/80; B01D 2325/24; B01D 71/00; B01D 71/025; B01D 71/027; B01D 67/202; B01D 2325/021; B01D 2325/08; B01D 2325/12; B01D 67/0088; B01D 2323/28; B01D 2323/46; B01D 67/0058; B01D 69/12; B01D 69/125; B01D 67/0006; B01D 67/0093; B01D 67/0009; B29C 67/202
See application file for complete search history.

(56) References Cited

U.S. PATENT DOCUMENTS

| | | | |
|---|---|---|---|
| 7,732,015 B2 | 6/2010 | Nomura et al. | |
| 7,799,839 B2 | 9/2010 | Yun et al. | |
| 2001/0019037 A1* | 9/2001 | Zakhidov | B82Y 20/00 216/56 |
| 2004/0262790 A1 | 12/2004 | Fu et al. | |
| 2005/0170159 A1* | 8/2005 | Ramsey | B01D 39/1661 428/212 |
| 2007/0122716 A1 | 5/2007 | Seo et al. | |
| 2009/0174117 A1 | 7/2009 | Winkler et al. | |
| 2009/0283480 A1 | 11/2009 | Schadler et al. | |
| 2010/0160466 A1 | 6/2010 | Elabd et al. | |
| 2010/0326513 A1 | 12/2010 | Lee et al. | |
| 2011/0073473 A1 | 3/2011 | Zheng et al. | |
| 2013/0072845 A1 | 3/2013 | Tennison et al. | |

FOREIGN PATENT DOCUMENTS

| | | |
|---|---|---|
| KR | 20080113440 A | 12/2008 |
| KR | 20110000966 A | 1/2011 |
| WO | WO-2011070363 A1 | 6/2011 |

OTHER PUBLICATIONS

Gates, Byron et al. "Fabrication and Characterization of Porous Membranes with Highly Ordered Three-Dimensional Periodic Structures" Chemistry of Materials vol. 11 Issue: 10, pp. 2827-2836, Published Oct. 1999.

Li, Xianfeng et al. "Ordered Nanoporous Membranes Based on Diblock Copolymers with High Chemical Stability and Tunable Separation Properties" Journal of Materials Chemistry, vol. 20 Issue: 21, pp. 4333-4339, Published: 2010.

Velev, Orlin D et al, "Colloidal Crystals as Templates for Porous Materials" Current Opinion in Colloid & Interface Science, vol. 5, Issue: 1-2, pp. 58-63, Published: 200.

Yang, Xiao-Yu et al. "Hierachically Structured Functional Materials: Synthesis Strategies for Multimodal Porous Networks" Pure and Applied Chemistry, vol. 81, Issue: 12, pp. 2265-2307, PUblished: Nov. 29, 2009.

Schmuhl, Riaan et al. "Nanostructured Ion-Selective MCM48 Membranes" Journal of Sol-Gel Science and Technology, vol. 31, Issue 1-3, pp. 249-252, Published Aug.-Sep. 2004.

Hatton, Benjamin et al. "Assembly of Large-Area, Highly Ordered, Crack-Free inverse Opal Films" Proceedings of the Natinal Academy of Sciences of the United States of America, vol. 107, Issue: 23, pp. 10354-10359, Published: Jun. 8, 2010.

Take, Hiroyoshi et al. " Preparation and Electronic Properties of Nanoporous Carbon Inverse Opal" Preparation and Electronic Properties of Nanoporous Carbon Inverse Opal, vol. 43, Issue: 7A, pp. 4453-4457, Published: Jul. 2004.

Ge, Jianping et al. "Responsive Photonic Crystals" Angewandte Chemie Int, Ed. 50, 1492 (2011).

Choi, Sung-Wook et al. "Three-Dimensional Scaffolds for Tissue Engineering: The Importance of Uniformity in Pore Size and Structure" Langmuir 26, 19001 (2010).

Shin, Ju-Hwan et al. "Facile Synthesis of TiO2 Inverse Opal Electrodes for Dye-Sensitized Solar Cells" Langmuir 27, 856 (2011).

Yang, Seung Yun et al. "Virus Filtration Membranes Prepared from Nanoporous Block Copolymers with Good Dimensional Stability Under High Pressures and Excellent Solvent Resistance" Advanced Functional Materials, 18, 1371 (2008).

Wang, Xi-Sen, et al. "Enhancing H2 Uptake by "Close-Packing" Alignment of Open Copper Sites in Metal-Organic Frameworks," Angewandte Chemie International Edition 47.38 (2008): 7263-7266.

Darling, S. B. "Directing the self-assembly of block copolymers." Progress in Polymer Science 32.10 (2007): 1152-1204.

Jackson, Elizabeth A., and Marc A. Hillmyer. "Nanoporous membranes derived from block copolymers: From drug delivery to water filtration." ACS nano 4.7 (2010): 3548-3553.

* cited by examiner

FIG. 2
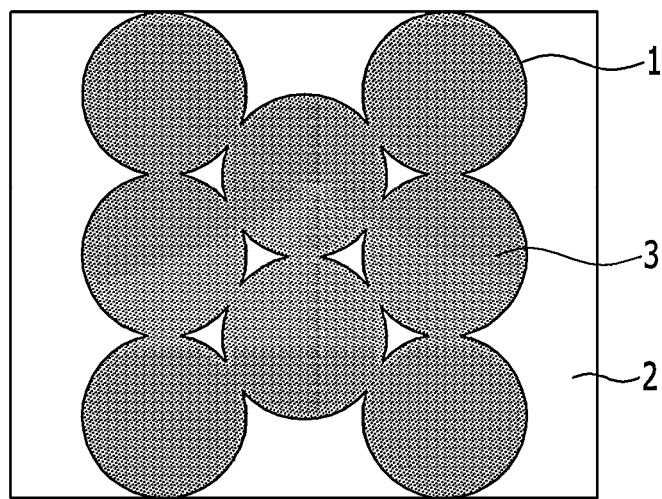
(a)
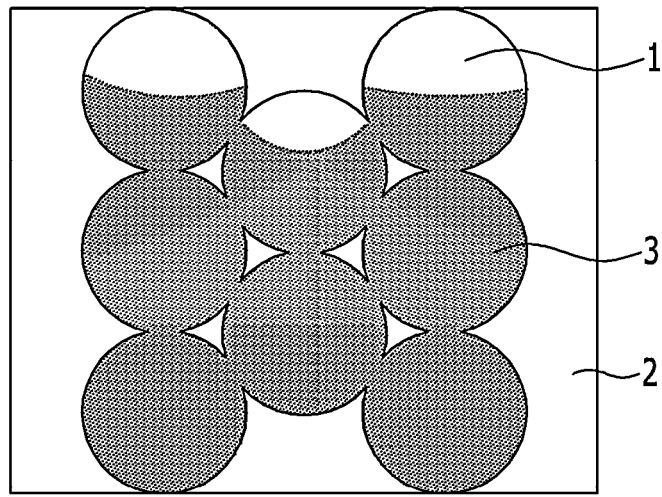
(b)

HYBRID POROUS STRUCTURED MATERIAL, MEMBRANE INCLUDING THE SAME, AND METHOD OF PREPARING HYBRID POROUS STRUCTURED MATERIAL

CROSS-REFERENCE TO RELATED APPLICATIONS

This application claims priority under 35 U.S.C. §119 to Korean Application No. 10-2013-0018973, filed on Feb. 22, 2013, the entire contents of which are incorporated herein by reference. This application is also a continuation-in-part under 35 U.S.C. §120 of U.S. application Ser. No. 13/469,858, filed on May 11, 2012, which claims priority under 35 U.S.C. §119 to Korean Application No. 10-2011-0114745, filed on Nov. 4, 2011, the entire contents of each of which are incorporated herein by reference.

BACKGROUND

1. Field

The present disclosure relates to a hybrid porous structured material, a membrane including the same, and a method of preparing a hybrid porous structured material.

2. Description of the Related Art

A membrane including pores may be used to separate a material of a specific size. Such a membrane may be applied for water treatment by removing pollutants using this property. The types of membranes that may be used for water treatment may be divided into a microfiltration membrane, an ultrafiltration membrane, a nanofiltration membrane, a reverse osmotic membrane, and the like according to the size of the micropores.

The characteristics of a membrane are determined according to the characteristics of the pores formed inside. For example, if the porosity of a membrane is relatively high, then the driving pressure may be decreased, but the physical strength may be reduced accordingly. On the other hand, if the porosity is decreased in order to increase the physical strength of a membrane, then the driving pressure may be increased. Furthermore, the selective separation of a material having a specific size may be enhanced by narrowing the size distribution of the pores formed in a membrane.

SUMMARY

Various example embodiments relate to a hybrid porous structured material having a desirable level of mechanical strength while having relatively high pore density per unit area, and including nanopores of a relatively uniform size.

Various example embodiments relate to a membrane using the hybrid porous structured material.

Various example embodiments relate to a method for preparing the hybrid porous structured material.

According to a non-limiting embodiment, a hybrid porous structured material may include a matrix including a plurality of first pores interconnected in three dimensions, and a porous material including second pores and filling wholly or partially the plurality of the first pores.

The plurality of the first pores may have a form of a plurality of spherical bodies that contact each other (e.g., overlap) and are interconnected in three dimensions. The plurality of the spherical bodies may be stacked as a close-packed structure (e.g., closest packing structure) in three dimensions.

The matrix may include a non-porous material. For example, the matrix may include a non-porous material selected from an inorganic oxide, a thermoplastic resin, a curable resin, and a combination thereof.

The porous material including the second pores may fill up to 90%, for example, up to 80%, for example, up to 70%, for example, up to 60% of the total volume of the plurality of the first pores in the matrix.

The porous material including the second pores may block the portion through which the plurality of the first pores are interconnected.

The porous material including the second pores may coat the inner surface of the plurality of the first pores.

The porous material including the second pores may include an organic porous material, an inorganic porous material, an organic/inorganic hybrid porous material, or a combination thereof.

The organic porous material may include a self-assembling block copolymer, amphiphilic liquid crystal, a metal containing self-assembling molecules, or a combination thereof. The inorganic porous material may include zeolite, a metal oxide, mesoporous carbon, or a combination thereof. The organic/inorganic hybrid porous material may include a metal-organic framework (MOF).

The organic porous material may derive from a self-assembling block copolymer. The self-assembling block copolymer may form a self-assembled structure. The self-assembled structure may include nanopores formed by partially or wholly removing a polymer that forms at least one block of the block copolymer.

The self-assembled structure may be a lamellar structure, a cylindrical structure, a spherical structure, a gyroidal structure, or a combination thereof.

The self-assembling block copolymer may include polystyrene-polymethyl methacrylate block copolymer (PS-b-PMMA), polystyrene-polybutadiene block copolymer (PS-b-PB), polystyrene-polyethylene oxide block copolymer (PS-b-PEO), polystyrene-poiyvinylpyridine block copolymer (PS-b-PVP), polystyrene-polyethylene-alt-propylene block copolymer (PS-b-PEP), polystyrene-polyisophrene block copolymer (PS-b-PI), or a combination thereof.

The first pore may have an average diameter of about 5 nm to about 100 μm.

The second pore may have an average diameter of about 1 nm to about 100 nm.

The hybrid porous structured material may have a shape of a membrane having two surfaces facing in the opposite directions and a thickness. The relative area occupied by the plurality of the first pores in each of the two surfaces may be about 5 to about 99% of the entire surface. The plurality of the first pores may not be exposed on a side wall of the membrane in the thickness direction.

The thickness of the membrane may be about 10 nm to about 1000 μm.

According to another non-limiting embodiment, a membrane may include the hybrid porous structured material.

The membrane may further include a support layer and may be formed as a composite membrane.

According to yet another non-limiting embodiment, a method for preparing a hybrid porous structured material may include a step of stacking a plurality of spherical shape-body particles for forming a plurality of first pores, so as for the spherical shape-body particles to contact each other in three dimensions; a step of injecting a liquid phase non-porous material into a gap between the plurality of the spherical shape-body particles, so as to fill the gap and coat the outer surface of the plurality of the spherical shape-body particles, and curing the liquid phase non-porous material; a step of dissolving the spherical shape-body particles to remove them, thus forming a matrix having a plurality of first pores stacked inside in contact each other in three dimensions; a step of injecting a self-assembling block copolymer including at least two polymers connected by a covalent bond into the plurality of the first pores in the matrix to form a hybrid porous structured material, and a step of partially or wholly eluting a polymer that forms at least one block of the self-assembling block copolymer to remove it, thus forming the porous material having second pores in the plurality of first pores in the hybrid porous structured material.

The step of stacking a plurality of spherical shape-body particles for forming a plurality of first pores, so as for the spherical shape-body particles to contact each other in three dimensions, may include a step of forming a stacked structure in which the spherical shape-body particles are stacked in a closest packing structure.

The spherical shape-body particles for forming a plurality of first pores may be colloidal particles.

The step of injecting a self-assembling block copolymer including at least two polymers connected by a covalent bond into the plurality of the first pores in the matrix may include a step of adjusting a concentration of the self-assembling block copolymer. By adjusting the concentration of the self-assembling block copolymer, the position on which the porous material having the second pores is present in the first pore may be controlled. For example, the porous material including the second pores may only be positioned on the portions through which the first pores are interconnected, or may be coated on the entire or a part of the inner surface of the first pores, depending on the concentration of the self-assembling block copolymer.

The size of the second pores in the porous material may be controlled by adjusting the relative ratio of the at least two polymers connected by a covalent bond in the self-assembling block copolymer.

BRIEF DESCRIPTION OF THE DRAWINGS

FIG. 2A shows a sectional view of a hybrid porous structured material 10 in which all of the plurality of the first pores 1 are fully filled with the porous material 3 including the second pores.

FIG. 2B shows a sectional view of a hybrid porous structured material 10 in which part of the plurality of the first pores 1 are fully filled with the porous material 3 including the second pores, and another part of the plurality of the first pores 1 are partially filled with the porous material 3 including the second pores.

DETAILED DESCRIPTION

Figure 1:
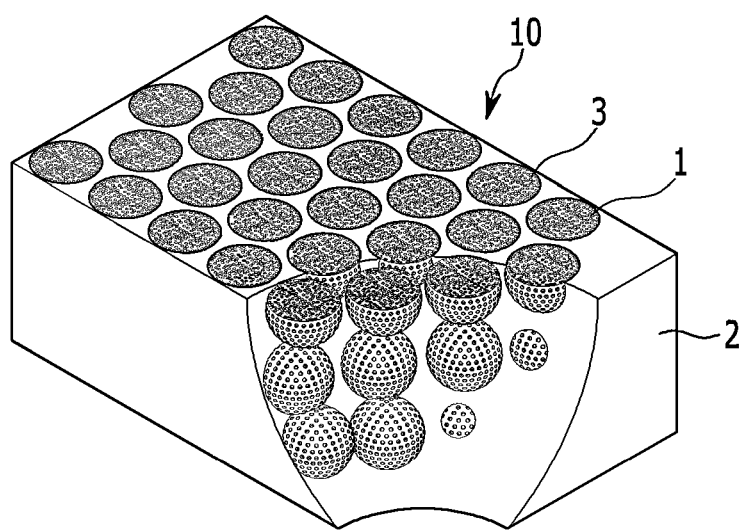
FIG. 1 is a schematic view of a hybrid porous structured material 10 according to a non-limiting embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

This disclosure will be described more fully hereinafter in the following detailed description, in which various example embodiments are described. It should be understood that this disclosure may be embodied in many different forms and is not limited to the example embodiments set forth herein.

As those skilled in the art would realize, the described embodiments may be modified in various different ways, all without departing from the spirit or scope of this disclosure. For instance, the size and thickness of each constituent element as shown in the drawings may have been exaggerated for a better understanding and ease of description. Thus, this disclosure is not limited to that which is shown in the drawings.

According to a non-limiting embodiment, a hybrid porous structured material may include a matrix including a plurality of first pores interconnected in three dimensions, and a porous material including second pores and filling wholly or partially the plurality of the first pores.

For example, the plurality of the first pores may have a shape of a plurality of spherical bodies that contact each other and are interconnected in three dimensions. The plurality of the spherical bodies may be stacked as a close-packed structure (e.g., closest packing structure) in three dimensions.

For example, the stacked structure may resemble an opal structure. The opal structure refers to a stacked structure where spherical bodies having a constant size are stacked in a closest packing arrangement. Examples of the closest packing structure may include hexagonal close-packing (hcp) and face-centered cubic (fcc) packing.

The matrix including a plurality of first pores may include a non-porous material selected from an inorganic oxide, a thermoplastic resin, a curable resin, and a combination thereof.

The hybrid porous structured material may have increased mechanical strength by including the non-porous material, as well as maintain high porosity in the entire structure as it contains high ratio of the porous region in high volume by including a plurality of first pores, and a porous material having second pores in the plurality of the first pores.

Further, the hybrid porous structure may control with relative ease the physical properties of the entire hybrid porous structure by controlling the size and porosity of the first and second pores.

FIG. 1 is a schematic view of a hybrid porous structured material 10 according to a non-limiting embodiment.

Referring to FIG. 1, a plurality of first pores 1 are connected each other in three-dimensional directions in a matrix 2. A porous material 3 including second pores as depicted as small dots is included in each of the plurality of first pores 1. In FIG. 1, the porous material 3 including the second pores is illustrated as filling an entirety of the plurality of the first pores 1, although example embodiments are not limited thereto.

In each drawing, the plurality of first pores 1 are the cavities defined by spherical wall of the matrix 2, although the spherical wall of the matrix 2 is indicated as the first pore 1 for the sake of explanation in some drawings.

According to another non-limiting embodiment, the porous material 3 including the second pores may fully fill each of the plurality of the first pores 1. Alternatively, a part of the plurality of the first pores 1 may be completely filled with the porous material 3 including the second pores, a part of the plurality of the first pores 1 may be partially filled with the porous material 3 including the second pores, and/or a part of the plurality of the first pores 1 may not be filled with the porous material 3 including the second pores at all.

FIG. 2A shows a sectional view of a hybrid porous structured material 10 in which the first pores 1 are formed in the matrix 2, and in which the entirety of the inside of the plurality of the first pores 1 are filled with the porous material 3 including the second pores.

FIG. 2B shows a sectional view of a hybrid porous structured material 10 in which the first pores 1 are formed in the matrix 2, and in which a part of the plurality of the first pores 1 are fully filled with the porous material 3 including the second pores, and another part of the plurality of the first pores 1 are partially filled with the porous material 3 including the second pores.

Figure 3:
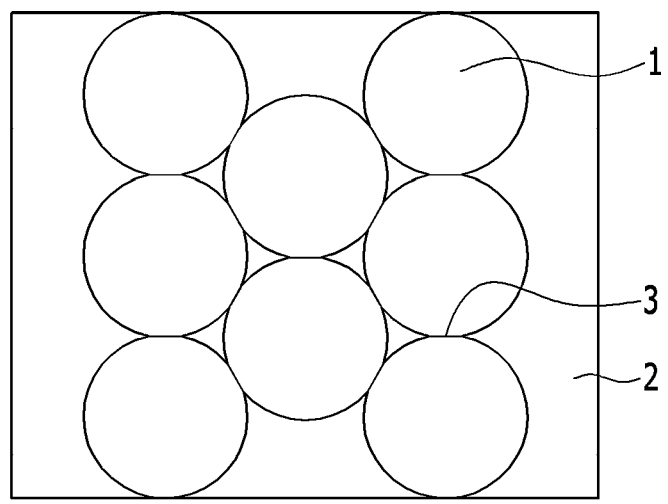
FIG. 3 is a sectional view of a hybrid porous structured material 10 in which the porous material 3 including the second pores is present only on the portions through which the first pores 1 are interconnected.

FIG. 3 shows an example where the porous material 3 including the second pores may be present only in specific portions in the plurality of the first pores 1.

Figure 4A:
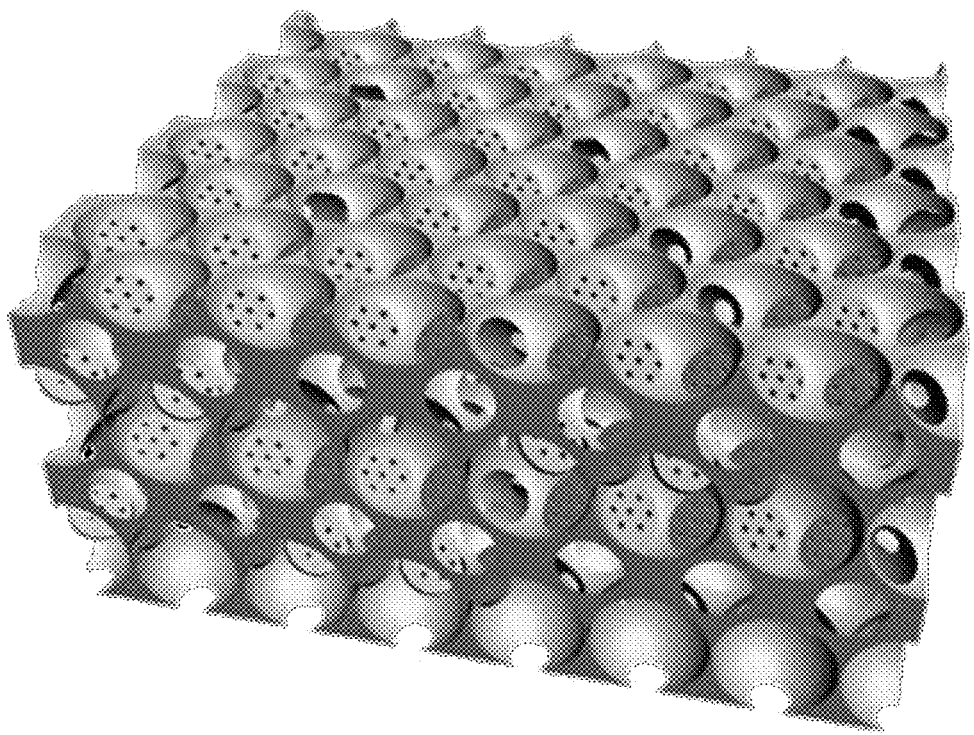
FIG. 4A is a three-dimensional view of FIG. 3.
Figure 4B:
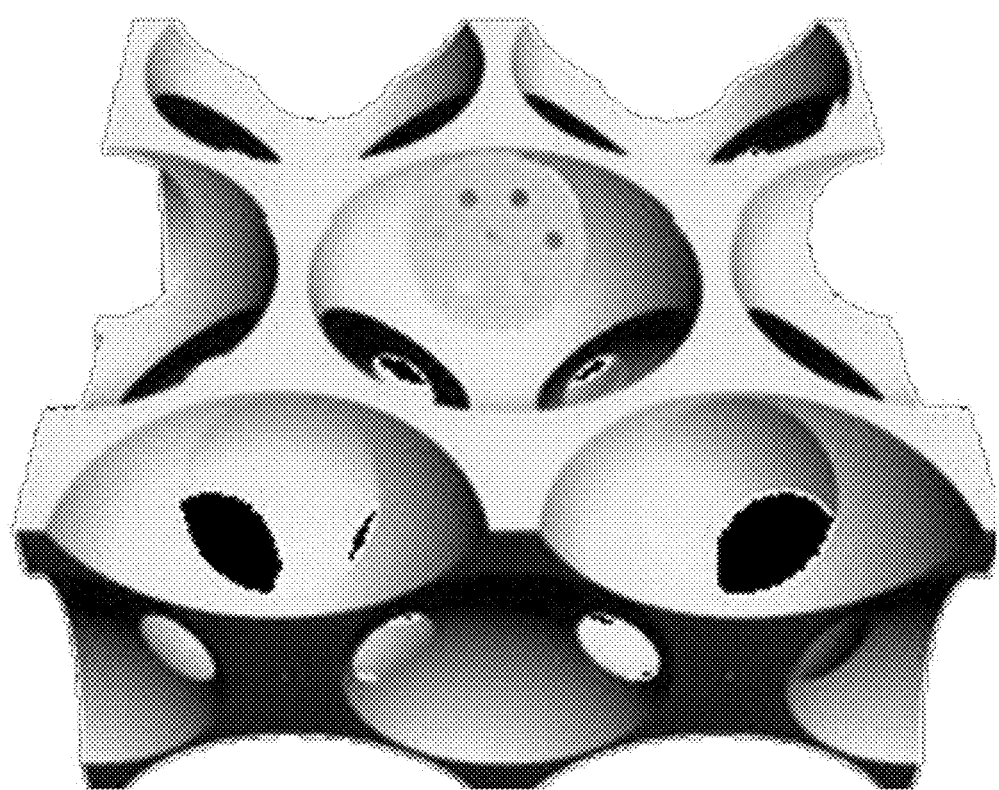
FIG. 4B is an enlarged view of a part of FIG. 4A.

Referring to FIG. 3, a plurality of the spherical first pores 1 are present in the matrix 2, and the porous material 3 including the second pores are present only on the portions through which the first pores 1 are interconnected. For instance, the first pores 1 may overlap with each other, and the porous material 3 may be locally provided so as to act as an interface/boundary between overlapping first pores 1. FIG. 4A is a three-dimensional view of FIG. 3, and FIG. 4B is an enlarged view of FIG. 4A.

Referring to FIG. 4A, spherical first pores 1 are stacked, and the porous material 3 including the second pores are present only in the portions through which the first pores 1 are interconnected. FIG. 4B is an extended view of a part of FIG. 4A. In FIG. 4B, the porous material 3 including the second pores are present only in specific positions, e.g., the portions through which a first pore 1 is connected with another first pore 1.

Figure 5:
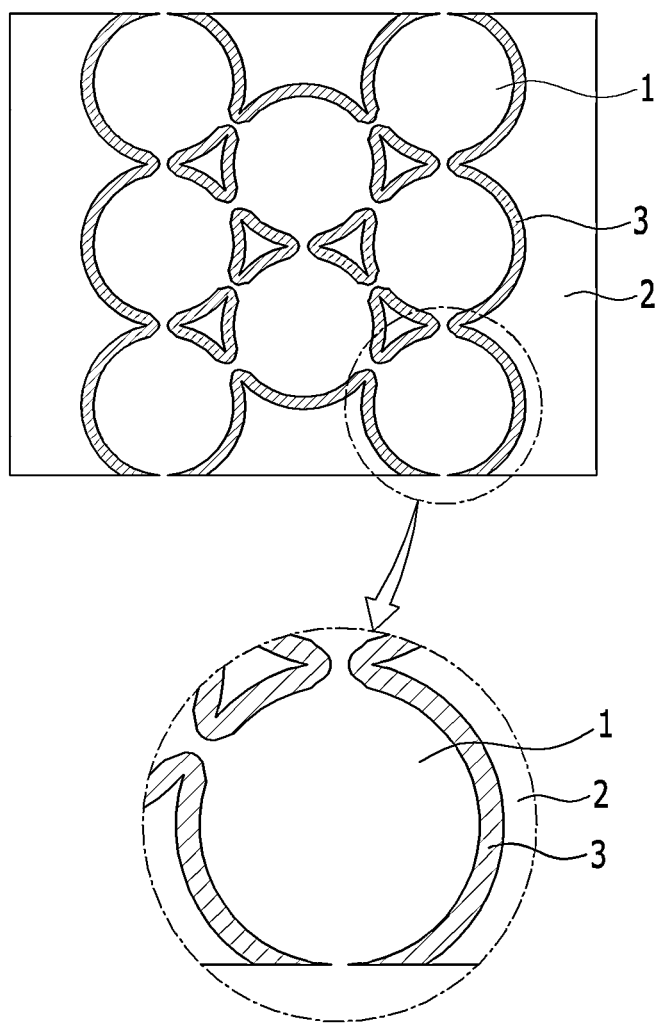
FIG. 5 is a sectional view of a hybrid porous structured material in which the porous material 3 including the second pores are coated on the inside surface of the plurality of the first pores 1.
Figure 6:
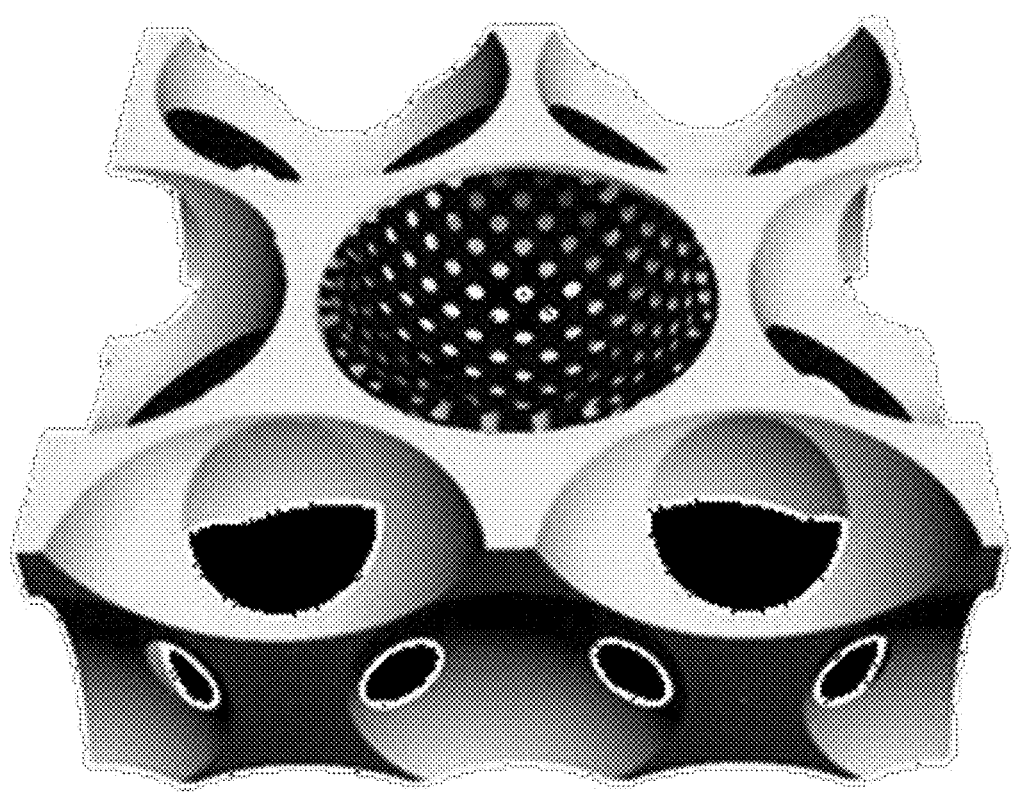
FIG. 6 is a three-dimensional view of FIG. 5.

FIG. 5 is a schematic vies of a hybrid porous structured material in which the porous material 3 including the second pores is coated on the inside surface of the plurality of the first pores 1 in the matrix 2. FIG. 6 shows a three-dimensional view of FIG. 5. Referring to FIG. 6, in contrast with FIGS. 4A-B, the entire surface of the inner wall of the first pores 1 is coated with the porous material 3.

Meanwhile, as described in more detail hereinafter, the thickness of the porous material including the second pores coated on the inner surface of the plurality of first pores may be controlled by adjusting the concentration or contents of the raw material of the porous material. Accordingly, if the porous material including the second pores is present in sufficiently high concentration, an entirety of the plurality of the first pores may be fully filled. Otherwise, even though an entirety of the plurality of the first pores may not be fully filled, the plurality of the first pores may be filled greater than or equal to a certain ratio in volume. For example, the porous material including the second pores may fill up to 90%, for example, up to 80%, for example, up to 70%, for example, up to 60% of the total volume of the plurality of the first pores in the matrix. In this case, the entirety of the plurality of the first pores may be equally filled in a certain portion, for example up to 90%, for example up to 80%, up to 70%, for example, up to 60% of the total volume of the plurality of the first pores in the matrix. Otherwise, a part of the first pores may be fully filled with the porous material, a part of the first pores may be filled with the porous material up to 90% in volume, a part of the first pores may be filled with the porous material up to 30% in volume, and a part of the first pores may not be filled with the porous material at all, at the same time.

The porous material including the second pores may be formed of any known suitable material without limitation. For example, the porous material may include an organic porous material, an inorganic porous material, an organic/inorganic hybrid porous material, or a combination thereof.

Examples of the inorganic porous material that may form the porous material may include zeolite, a metal oxide such as silica and the like, and mesoporous carbon and the like. Examples of the organic/inorganic hybrid porous material that may form the porous material may be formed as a metal-organic composite framework (MOF). Materials including nanopores formed in the particles may be used as the porous material. The nanopores may have an average size of about 1 nm to about 1,000 nm, for example about 5 nm to about 500 nm, or about 10 nm to about 100 nm.

The organic porous material that may form the porous material may be, for example, a self-assembling block copolymer. The self-assembling block copolymer has a morphology where one end of at least two kinds of polymers are connected by a covalent bond or a chemical bond. The self-assembling block copolymer may be a material that forms a thermodynamically stable nanostructure, for example, a spherical structure, a cylindrical structure, a lamellar structure, a gyroidal structure, and the like, by microphase separation due to non-compatibility of each block. In order to prepare the porous material including the second pores, a self-assembled structure including pores may be formed by partial or complete removal of a polymer that forms at least one block of the self-assembling block copolymer. The produced pores may have a complicated structure such as a tube shape and the like instead of a spherical shape, and the tube-shaped nanopores may have an average diameter of about 1 nm to about 100 nm. The pores may be prepared using a solvent that selectively dissolves a specific polymer included in the self-assembling block copolymer.

The self-assembling block copolymer forming the porous material may include any block copolymer known to be capable of forming the relatively fine nanostructure, without limitations. For example, a block copolymer of a polystyrene block and another polymer block other than a polystyrene may be used. For example, the self-assembling block copolymer may include polystyrene-polymethyl methacrylate block copolymer (PS-b-PMMA), polystyrene-polybutadiene block copolymer (PS-b-PB), polystyrene-polyethylene oxide block copolymer (PS-b-PEO), polystyrene-polyvinylpyridine block copolymer (PS-b-PVP), polystyrene-polyethylene-alt-propylene block copolymer (PS-b-PEP), polystyrene-polyisoprene block copolymer (PS-b-PI), or a combination thereof, and it is not limited thereto.

Another example of the organic porous material forming the porous material may include, for example, an organic material of a hybrid single molecule or a hybrid small molecule capable of self-assembly. Specifically, a liquid crystal as an amphiphilic small molecule, or a metal-containing single molecule or small molecule material such as metallocene may be used. In addition, a single molecule or small molecule material that may be self-assembled through a hydrogen bond, metal coordination, a hydrophobic bond, a Van der Waals bond, a pi-pi interaction, and an electrostatic effect may be used. After forming the nano-structure from the hybrid material that may be self assembled, a part of the hybrid material may be removed to form a porous material forming the second pore structure.

Since the hybrid porous structured material according to an example embodiment includes a porous material of the above described nanostructure, it may be effectively applied particularly for biofiltration for water treatment that may selectively separate particles of a specific size as well as for a membrane material for a nanofiltration membrane and an ultrafiltration membrane.

To apply the hybrid porous structured material for a membrane and the like, the physical characteristics should be controlled, and the pore size and structure of the porous material should be relatively uniform in order to allow adequate control the physical characteristics. Since the self-assembled structure may be controlled with relative ease by controlling the molecular weight of the self-assembling block copolymer, the content ratio of polymers forming each block, and the like, and designed so as to have a relatively uniform nanostructure of a desired size, a porous region including a porous structure of a uniform nanostructure may be formed with relative ease in the self-assembled structure by partially or wholly removing at least one block to form the pores. As previously explained, the self-assembling block copolymer may form a porous material of a relatively uniform nanostructure, and the manufacturing process is relatively simple. Thus, the self-assembling block copolymer may be relatively useful as a material for forming the porous material including the second pores of the hybrid porous structured material.

In order for the hybrid porous structured material to be usefully applied for a membrane, it should have a relatively uniform nanopore structure. At the same time, the pore density per unit area of the entire hybrid porous structured material should be relatively high. If the pore density per unit area of the entire hybrid porous structured material is relatively high, then the effective function of the membrane may be expected even under a relatively low applied pressure. As explained, a porous structure of a uniform nanostructure may be formed using the self-assembling block copolymer, and the pore density per unit area of the entire hybrid porous structured material may be increased by forming the porous material as a stacked structure where a plurality of spherical bodies contact each other in three dimensions.

When the size distribution of the first pores in the hybrid porous structure is narrow or the pores are formed almost uniform, the pore density of the entire hybrid porous structure per unit area may be increased while maintaining a desirable level of mechanical strength. Meanwhile, the size of the first pores may be varied according to the use of the hybrid porous material. For example, the first pores may be sequentially stacked with decreasing or increasing size.

Pore density of the entire hybrid porous structured material per unit area may be controlled by controlling the size of the first pores constituting the stacked structure in the porous material where a plurality of the first pores are stacked so as to contact each other in three dimensions. For example, the first pore 1 constituting the stacked structure may have an average diameter of about 1 nm to about 100 μm, or about 10 nm to about 10 μm. In another example, it may have an average diameter of about 100 nm to about 1 μm. The hybrid porous structured material may be used for a membrane having a relatively high pore density per unit area by including the plurality of the first pores having the above size range so as to have the above porosity range.

In the hybrid porous structure, each first pores may be three-dimensionally connected by forming a stacked structure of a plurality of spherical bodies that contact each other and are interconnected. Due to the properties of the three-dimensional connection structure, compensation for defects may be automatically made and thus when applied to a membrane, a desirable effect of separating a target material of a specific size may be exhibited.

The hybrid porous structure can exhibit a desirable rejection rate, even when the porosity is not the maximum per unit area. Particularly, as described in the Examples, in the hybrid porous structure prepared in Example 1, the porous material including the second pores is present only on the portions through which the first pores are interconnected, not fully filling the first pores. In the hybrid porous structure prepared in Example 1, the porosity is not higher compared to those prepared in Examples 2 and 3, but the former has a much higher water flux than the latter. Specifically, when evaluating rejection rate for Au (gold) particles of 5, 10, 20, and 30 nms in diameter, the membranes including the hybrid porous structures of Examples 1 and 4, in which the size of the second pores are adjusted to as 16 nm and 22 nm, respectively, show 100% rejection rate for the Au particles of 20 nm in diameter, while the membrane including the hybrid porous structure of Example 4 shows 89% of the Au particle. That is, although the porous material does not fully fill the inside of the first pores and is present only on the portions at which the first pores are connected, the membrane can completely reject particles bigger than the size of the second pores. This indicates that the second pores present on the portions through which the first pores are interconnected act as microsieve, thus particles bigger than the second pores cannot pass through the pores from one first pore to another first pore. Thus, even though the porosity per unit area is not a maximum, the rejection rate can still be desirable.

Meanwhile, the membranes including the hybrid porous structures prepared in Examples 1 and 4 have higher water flux than those including the hybrid porous structures prepared in Examples 2 and 3. However, as described in Experimental Example 1, the water flux of the membrane including hybrid porous structure of Example 1 is about 2,000 LMH, which is about 20 times higher than the membrane including hybrid porous structure of Example 3, and about 3 times higher than the membrane including hybrid porous structure of Example 2. This increase in water flux could have not been expected, even when compared to the commercial ultrafiltration membrane having water flux of about 1,000 LMH. Further, the membrane including the hybrid porous structure of Example 1 has 100% rejection rate of particles bigger than the size of the second pores, while maintaining the high water flux.

Meanwhile, the matrix including the first pores is formed by a non-porous material, which may improve mechanical characteristics of the hybrid porous structure. For example, in a membrane for water treatment, the matrix may have an average pore size in the range of about 1 to about 30 Å. If used as a selective membrane for a gas such as $CO_2$, the non-porous characteristic may be reinforced so as to have a smaller pore size range. That is, a pore size that embodies the non-porous characteristic may be varied according to the use of the membrane. As explained, since the hybrid porous structure includes a matrix including a plurality of first pores interconnected in three dimensions and the matrix itself is made of a non-porous material, it has a hierarchical pore structure by simultaneously including the porous material contained in the first pores.

As the material forming the non-porous material, any non-porous material that may maintain adequate mechanical strength of the hybrid porous structure to a desired degree and that may be applied to the following preparation method may be used without limitation. According to the following method of preparing a hybrid porous structure, a three-dimensional stacked structure may be prepared with colloid particles, and a non-porous region is formed so as to fill the gap between the colloid particles. Then, the stacked structure of the colloid particles is removed to form a matrix containing plurality of first pores of the non-porous region. The non-porous region may not be removed during the process of removing the stacked structure of colloid particles, and it may not be removed during the process of forming the second pores of the porous material contained in the first pores. Any material may be used without limitation as long as it satisfies these conditions for the preparation process: the material has a non-porous characteristic suitable for use, and has a desirable level of (or, alternatively, a predetermined level of) mechanical strength. For example, a non-porous material forming the matrix may be an inorganic oxide, a thermoplastic resin, a curable resin, and the like.

Specific examples of the inorganic oxide that may be used as a material forming the non-porous material may include titanium oxide, tin oxide, lead oxide, zirconium oxide, nickel oxide, copper oxide, yttrium oxide, magnesium oxide, calcium oxide, aluminum oxide, boron oxide, silicon oxide, zeolite, and the like. A solution including a precursor of the inorganic oxide may be injected so as to fill a gap between a plurality of spherical bodies forming the stacked structure and then cured by sol gel reaction to form a non-porous region.

Specific examples of the thermoplastic resin that may be used as the non-porous material may include polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylene fluoride, polyvinyl chloride, cellulose acetate, cellulose diacetate, cellulose triacetate, and the like.

The curable resin that may be used as the non-porous material may be selected from a thermosetting resin, a photocurable resin, and a combination thereof. As the thermosetting resin and the photocurable resin, any suitable resin known as a thermosetting resin or photocurable resin may be used without limitation. Specifically, a thermosetting resin such as polydimethylsiloxane (PDMS) or a photocurable resin that may be cured by electromagnetic waves such as an UV curable resin may be used. Specific examples of the UV curable resin may include a polyurethane-based, a polyacrylate-based, a polyepoxy-based, a polyurethaneacrylate-based, a polyesteracrylate-based, a polyepoxyacrylate-based, and a silicon-based UV curable resin, and the like.

A thermoplastic resin mixed with a solvent or a curable resin mixed with a solvent, or a liquid phase thermoplastic resin or a liquid phase curable resin of a molten state, may be injected so as to fill a gap between a plurality of spherical bodies forming the stacked structure, and then dried, cooled, or cured to form a non-porous matrix.

The hybrid porous structure may be formed of materials constituting a hybrid porous hierarchical structure as explained above. The hybrid porous structured material may effectively perform even under a relatively low driving applied pressure and has a desirable level of mechanical stability. Thus, the hybrid porous structured material may be usefully applied as a material for the next generation membrane for water treatment Furthermore, the hybrid porous structured material may selectively separate nanobodies or environmental materials, and thus it may be applied for sewage/waste water treatment, food processing, oil separation, and the like.

The hybrid porous structured material may be formed as a membrane having two surfaces facing in the opposite directions and a thickness. A relative area occupied by the first pores in each of the two surfaces is about 5 to about 99% of the entire surface. The first pores may not be exposed on a side wall of the membrane, wherein the side wall extends in the thickness direction. For example, the relative area occupied by the first pores in each of the two surfaces may be about 25 to about 90% of the entire surface, or about 50 to about 80%.

The hybrid porous structure may be formed as a membrane having a thickness of about 10 nm to about 1000 μm. If the thickness of the membrane is increased, the mechanical strength may be increased, but a relatively high applied pressure may accordingly be required. As such, the thickness of the membrane may be controlled so as to have a desired characteristic according to the use of the membrane. For example, the membrane may have a thickness of about 100 nm to about 500 μm. As another example, the membrane may have a thickness of about 1000 nm to about 250 μm.

According to yet another non-limiting embodiment, a membrane including the hybrid porous structured material is provided.

The membrane may be manufactured into a microfiltration (ME) membrane, an ultrafiltration (UF) membrane, a nanofiltration (NF) membrane, a reverse osmosis (RO) membrane, a forward osmosis (FO) membrane, and the like, by controlling the nanopore structure of the porous region according to use.

The membrane may be manufactured into a single membrane or a composite membrane further including a heterogeneous material membrane. For example, the membrane may be a single membrane formed of the hybrid porous structured material (hereinafter referred to as a "hybrid porous structured material membrane"). If the membrane is a composite membrane, it may be, for example, a composite membrane including a support layer bonded to the hybrid porous structured material membrane. The shape and kind of the support layer are not specifically limited, and a layer formed by a known method using a known material may be used.

If the membrane is a composite membrane, the thickness of the hybrid porous membrane may be as explained above, and the thickness of the support layer may be about 200 μm to about 500 μm, for example about 100 μm to about 250 μm, or about 50 μm to about 125 μm.

The support layer may be manufactured according to whether a membrane to be manufactured is a microfiltration (MF) membrane, an ultrafiltration (UF) membrane, a nanofiltration (NF) membrane, a reverse osmosis (REQ) membrane, or a forward osmosis (FO) membrane. The support layer may be manufactured by including one selected from polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, polyepoxy-based resin compound, a polyolefin-based compound, a polyphenylene vinylene compound, a polyamide-based compound, a polyacrylonitrile-based compound, a polysulfone-based compound, cellulose-based compound, polyvinylidene fluoride (PVDF), polytetrafluoroethylene (PTFE), a polyvinyl chloride (PVC) compound, or a combination thereof.

Hereinafter, a preparation method of the hybrid porous structured material will be explained. The method for preparing the hybrid porous structured material may include a step of stacking a plurality of spherical shape-body particles for forming a plurality of first pores, so as for the spherical shape-body particles to contact each other in three dimensions, a step of injecting and curing a liquid phase non-porous material, so as to fill a gap between the plurality of spherical shape-body particles that form the stacked structure and to coat the outer surface of the plurality of spherical shape-body particles, a step of dissolving the spherical shape-body particles to remove them, thus forming a matrix having a plurality of first pores stacked, a step of injecting a self-assembling block copolymer including at least two polymers connected by a covalent bond into the plurality of the first pores in the matrix, and a step of partially or wholly eluting a polymer that forms at least one block of the self-assembling block copolymer to remove it, thus forming the porous material having the second pores so as to form a hybrid porous structured material.

The step of stacking a plurality of spherical shape-body particles for forming a plurality of first pores, so as for the spherical shape-body particles to contact each other in three dimensions, may include a step of forming a stacked structure in which the spherical shape-body particles are stacked in a closest packing structure.

Figure 7:
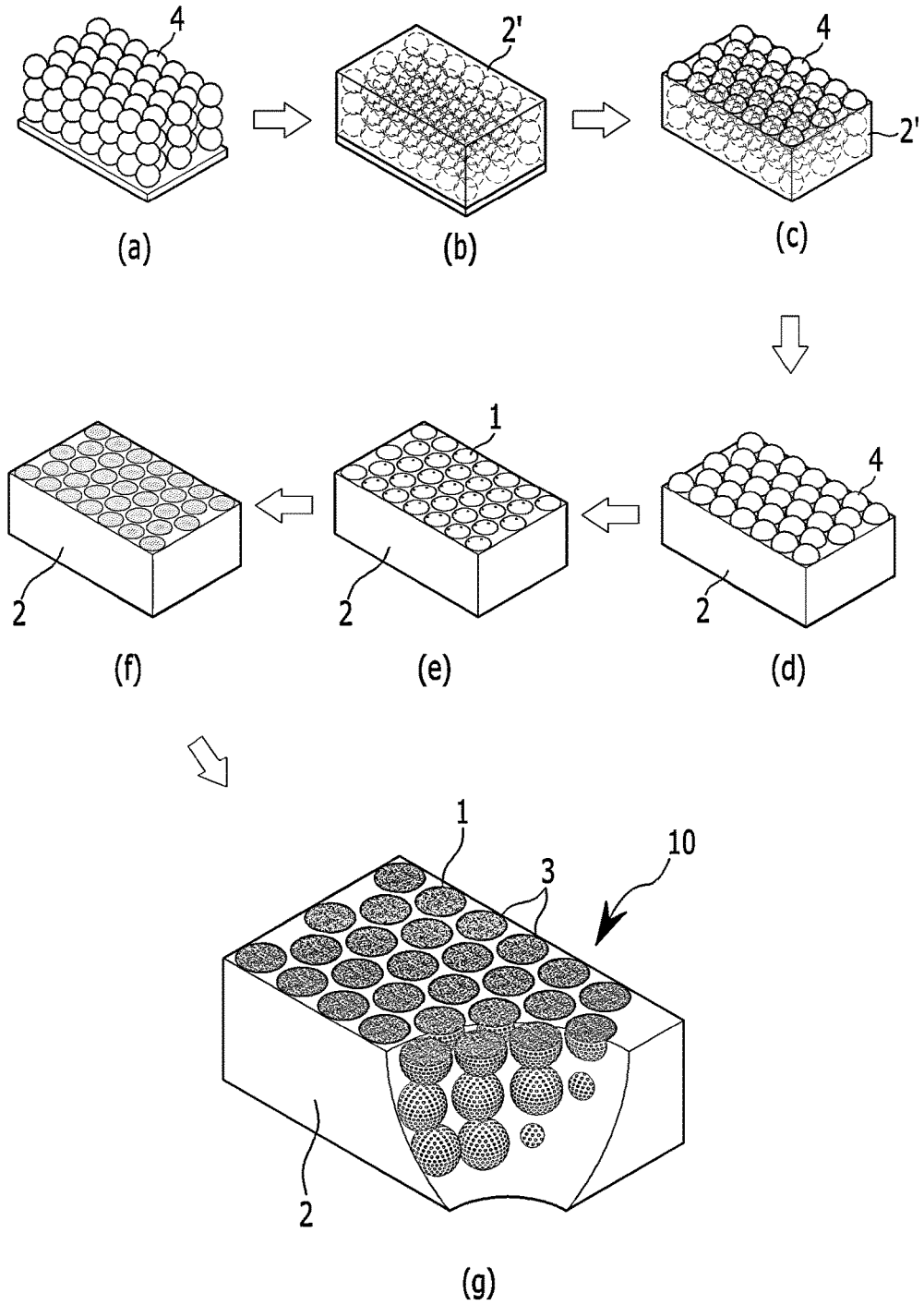
FIG. 7 is a schematic view of a method of preparing a hybrid porous structured material according to a non-limiting embodiment.

FIG. 7 is a schematic view of a method of preparing a hybrid porous structured material according to a non-limiting embodiment.

First, a stacked structure is formed, wherein spherical body particles 4 for forming plurality of first pores are stacked so as to contact each other in three dimensions. In FIG. 7(a), a stacked structure is formed so as to resemble an opal structure of spherical body particles 4 for forming the plurality of the first pores. As explained, the size of the spherical body particles 4 may be determined according to pore density per unit area of the hybrid porous structure to be ultimately obtained. For example, the average diameter of the spherical body particles 4 may be about 1 nm to about 100 μm, for example about 10 nm to about 10 μm, or about 100 nm to about 1 μm. The spherical body particles 4 and the shape of the stacked structure may be as previously explained for the shape of the first pores of the hybrid porous structure. For example, the spherical body particles 4 may be arranged to resemble an opal structure while having the above size range.

As the spherical body particles 4 for forming a plurality of first pores, any suitable material that may be selectively removed by etching after forming a non-porous matrix 2 may be used without limitation. For example, for a relatively small size deviation between the spherical body particles 4, colloid particles may be used as the spherical body particles 4. For example, an opal structure of colloid particles having a crystal lattice may be formed by spin coating, dip coating, sedimentation, a spray method, a coating method using external stimulation such as electrophoresis and the like, a Langmuir-Blodgett (LB) method, a form-guide method, and the like, or using inorganic colloid particles such as $SiO_2$ or organic colloid particles such as polystyrene (PS) and polymethylmetacrylate (PMMA).

A liquid phase material 2' for forming a non-porous matrix is injected so as to completely fill the gap between the spherical body particles 4 of the stacked structure, thereby forming a structure (FIG. 7(*b*)). The liquid phase material 2' for forming a non-porous matrix may include a thermoplastic resin, a curable resin, or an inorganic oxide precursor solution. The detailed description thereof may be as previously explained in connection with the non-porous matrix included in the hybrid porous structured material. A method for injecting the liquid phase material 2' for forming a non-porous matrix may include spin coating, capillary filling, dip coating, a spray method, and the like, but is not limited thereto.

To manufacture a hybrid porous structured material 10 as a free-standing thin film type with both sides of the film open and exposed, before the material 2' for forming a non-porous matrix is cured to form a non-porous matrix 2, a part of the material 2' for forming a non-porous matrix is removed so that the spherical body particles 4 may be exposed on the surface, thus exposing the spherical body particles 4 on both sides of the thin film (FIG. 7(*c*)). Subsequently, the liquid phase material 2' for forming a non-porous matrix is cured to form a non-porous matrix 2 (FIG. 7(*d*)). The degree of exposure of the spherical body particles 4 may be controlled such that a relative area occupied by the first pores 1 on one surface of the thin film may be about 5 to about 99%, for example about 25 to about 90%, or about 50 to about 80% of the entire area.

Subsequently, the spherical body particles 4 are removed using a solvent that may selectively dissolve them for removal, to form a matrix 2 containing plurality of first pores 1 of a three-dimensional stacked structure previously occupied by the spherical body particles 4 (FIG. 7(*e*)). In FIG. 7(*e*), the relatively small points shown in the first pores 1 indicate that the first pores 1 are interconnected.

For example, if the spherical body particles 4 are inorganic oxide colloid particles such as $SiO_2$, then they may be removed using hydrofluoric acid (HF). On the other hand, if the spherical body particles 4 are organic colloid particles such as polystyrene, then they may be removed using an organic solvent such as toluene and the like. The size of the lattice structure of the first pores of a stacked structure and the size of pores in the connection part between the lattices may be controlled according to the kind and size of the colloid particle used as the spherical body particles 4.

A self-assembling block copolymer is injected in the first pores 1 of the matrix 2 containing the first pores 1 to form a self-assembled structure (FIG. 7(*f*)). Subsequently, a polymer that forms at least one block in the self-assembling block copolymer is partially or wholly eluted and removed to form a porous material 3 including second pores, thus obtaining a hybrid porous structured material 10 having a hierarchical pore structure (FIG. 7(*g*)).

The injection of the self-assembling block copolymer in the first pores 1 of the matrix 2 containing the first pores 1 may be conducted by penetrating a molten liquid or diluted solution of the self-assembling block copolymer in the first pores 1 by, for example, capillary filling, spin coating, dip coating, spray coating, and the like. Subsequently, the molten liquid or diluted solution of the self-assembling block copolymer may be solidified (to form a self-assembled structure) to coat the internal surface of the first pores 1 with the self-assembling block copolymer of a self-assembled structure. A molten liquid or diluted solution of the self-assembling block copolymer may be used according to the injection method of the self-assembling block copolymer.

To partially or wholly elute a polymer forming at least one block of the self-assembling block copolymer and remove it, etching may be conducted using a solvent that selectively dissolves a polymer forming at least one block of the self-assembling block copolymer. By forming a porous material 3 in the first pores 1 of the matrix 2 containing the first pores 1, a hybrid porous structured material 10 including a first pores 1 in a non-porous matrix 2 and a porous material 3 including the second pores smaller than the first pores may be obtained.

As explained, since the method for preparing the hybrid porous structured material 10 first involves forming a non-porous matrix 2 containing first pores, and then injecting a material forming a porous material including the second pores into the first pores 1, it may be applied with relative ease for a relatively large area processing and industrial processing of a thickness of dozens of micrometers.

The step of injecting a self-assembling block copolymer into the plurality of first pores 1 in the matrix 2 may include a step of adjusting a concentration of the self-assembling block copolymer. By adjusting the concentration of the self-assembling block copolymer, the position on which the porous material having the second pores is present in the first pore 1 or the ratio of the porous material 3 including the second pores with relative to the total volume of the plurality of the first pores 1 may be controlled.

Figure 8:
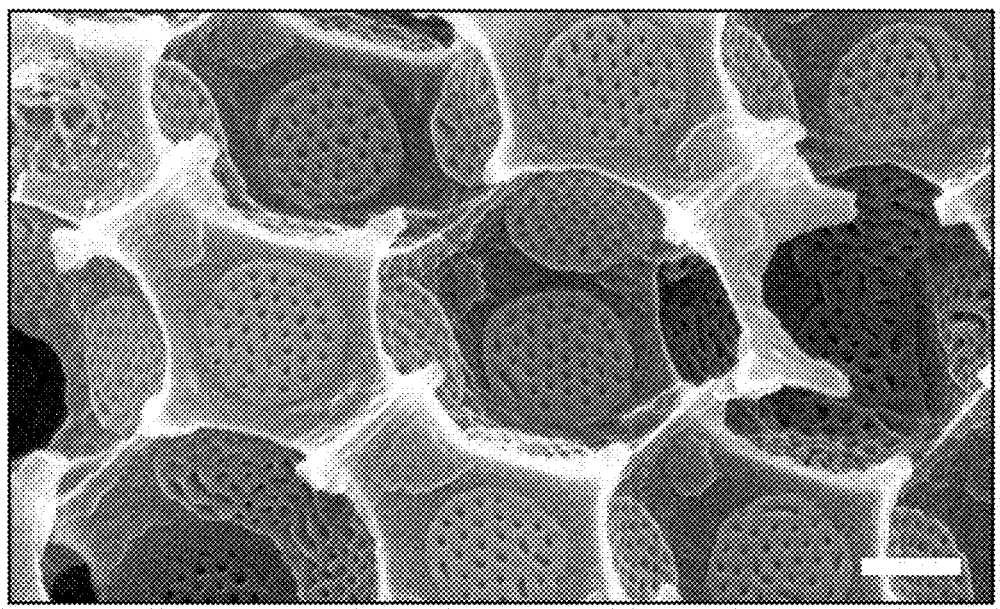
FIG. 8 is a scanning electron microscope (SEM) photograph of a cross-section of a hybrid porous structured material prepared in Example 1, in which the porous material including the second pores blocks the portions through which the first pores are interconnected.

Particularly, as described in the Examples, when using a polystyrene-polymethacrylate block copolymer (PS-b-PMMA) containing about 20% to 30% of polymethacrylate (PMMA) is used as a self-assembling block copolymer, the contents of porous material and the position on which the porous material including the second pores is present in the first pores are different, depending on the concentration of the block copolymer in a solution. For example, when the concentration of the block copolymer is 7%, when the concentration of the block copolymer is 10%, or when the concentration of the block copolymer is 14%, based on the total weight of the solution, the contents of porous material and the position on which the porous material including the second pores is present in the first pores are different. For example, when the solution containing about 7% of the block copolymer is used for forming a non-porous material including the second pores (Example 1), the porous material including the second pores is present on the portions through which a first pore is connected with another first pore in each of the plurality of the first pores, blocking the portions where there is no surface defining the first pores. This is shown in FIGS. 3 and 4. As shown from FIGS. 4A and 4B, porous material including much smaller pores than the first pores is present only on the portions through which the first pores are interconnected in the plurality of the first pores having a structure of stacked spherical-shaped bodies. FIG. 8 is a scanning electron microscope (SEM) photograph of a cross-section of a hybrid porous structured material prepared in Example 1, which shows the porous material including the second pores is present only on the portions through which the first pores are interconnected.

Figure 9:
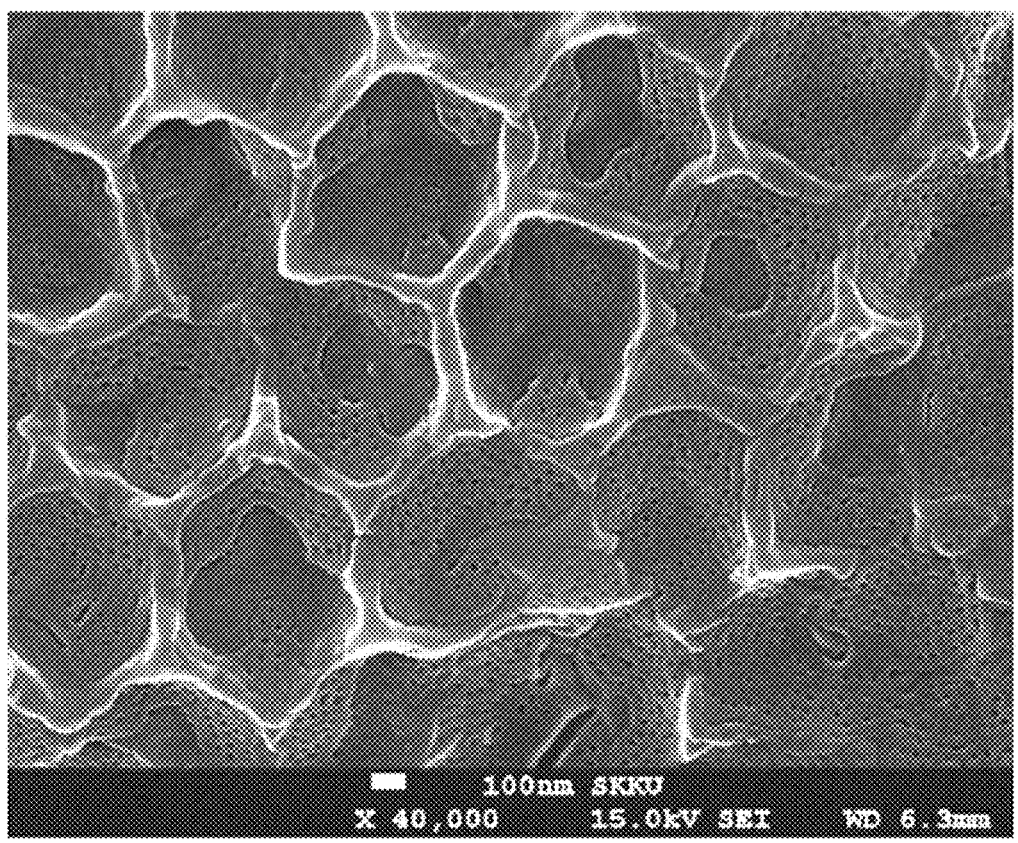
FIG. 9 is a scanning electron microscope (SEM) photograph of a cross-section of a hybrid porous structured material prepared in Example 2, in which the porous material including the second pores is coated on the inside surface of the first pores.

FIG. 9 is a scanning electron microscope (SEM) photograph of a cross-section of a hybrid porous structured material prepared in Example 2, using a solution having the concentration of the block copolymer of 10 wt %, in which the porous material including much smaller pores than the first pores is entirely coated on the inside surface of the first pores.

Figure 10:
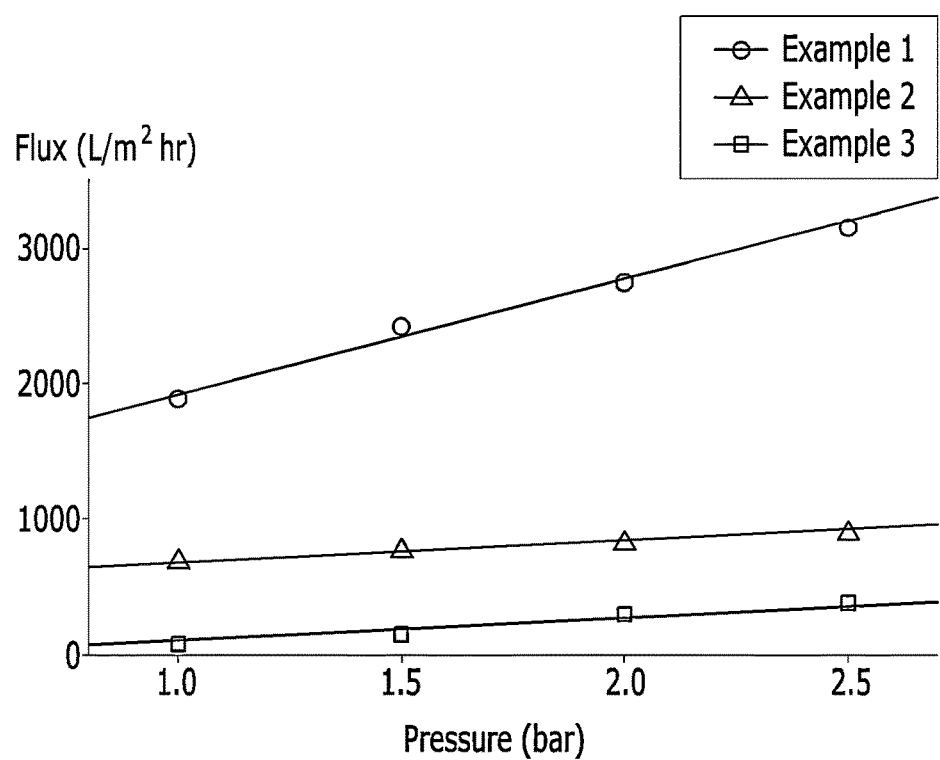
FIG. 10 shows the water fluxes of the separation membranes including the hybrid porous structured material prepared in Examples 1 to 3, depending on the change of pressure.

FIG. 10 shows the water fluxes of the separation membranes including the hybrid porous structured material prepared in Examples 1 to 3, depending on the change of pressure.

Meanwhile, the size of the second pores included in the porous material may be controlled by adjusting the relative ratio or the kinds of the at least two polymers in the self-assembling block copolymer. For example, as described in Examples 1 and 4, when the volume ratio of PMMA is 20% in the polystyrene-polymethylmethacrylate block copolymer (PS-b-PMMA) (Example 1), the diameter of the second pores are about 16 nm, when the mole ratio of PMMA is 28% in the polystyrene-polymethylmethacrylate block copolymer (PS-b-PMMA) (Example 4), the diameter of the second pores are about 22 nm.

The size of the second pores of the porous material prepared from a block copolymer can be uniformly controlled with relative ease by adjusting the contents of the polymers in the block copolymer. The hybrid porous structure having the second pores as controlled can select the size of impurities to be separated. For example, the hybrid porous structure having second pores of 16 nm in diameter can remove 100% of Au particles of 20 nm in diameter, while the rejection rate of the hybrid porous structure having second pores of 22 nm in diameter against the Au particles of 20 nm in diameter is about 89%.

As such, the method of preparing the hybrid porous structure according to an example embodiment can control with relative ease the size of the plurality of first pores in the non-porous matrix, through which a feed solution containing impurities passes, as well as the size of the second pores much smaller than the first pores is also uniformly controlled with relative ease.

Further, the method of preparing the hybrid porous structure according to an example embodiment can control with relative ease the position and contents of the porous material including the second pores in the first pores of the hybrid porous structure by adjusting the contents or concentration of the porous material including the second pores. Thus, the water flux or rejection rate for impurities of the membrane including the hybrid porous structure can be controlled with relative ease.

Particularly, as described in the Examples, according to an example embodiment, when the porous material including the second pores can be present only on the portions through which the first pores are interconnected and block the portions, there is no obstacle in the first pores through which a feed solution passes, thus, when the hybrid porous structure is used a membrane for water treatment, the water flux can drastically improve. Specifically, the hybrid porous structure prepared in Example 1 using a solution containing 7 wt % of polystyrene-polymethacrylate block copolymer (PS-b-PMMA), the water flux at 1 bar pressure is about 2000 LMH, which is two times of that of the conventional ultrafiltration membrane. Meanwhile, the hybrid porous structure prepared in Example 2 using a solution containing 10 wt % of polystyrene-polymethacrylate block copolymer (PS-b-PMMA), the water flux at 1 bar pressure is less than 700 LMH. Further, the hybrid porous structure prepared in Example 3 using a solution containing 14 wt % of polystyrene-polymethacrylate block copolymer (PS-b-PMMA), the water flux at 1 bar pressure is only about 100 LMH.

Further, as shown from FIG. 10, a membrane including the hybrid porous structure prepared in Example 1, the water flux at 2.5 bar pressure is about 2,000 LMH, and the mechanical strength of the membrane is sufficiently guaranteed.

Moreover, the hybrid porous structure prepared in Example 1 can still maintain a relatively high rejection rate, as well as the relatively high water flux. Thus, the membrane including the structure would be very useful as a membrane for water treatment having a relatively high water flux, as well as a relatively high rejection rate. These effects show that the second pores, which are present on the portions through which the first pores are interconnected according to an example embodiment, act like a microsieve blocking pass of impurities from one first pore to another first pore in the hybrid porous structure.

As described above, the hybrid porous structure according to an example embodiment can control and uniformly maintain with relative ease the size and porosity of the first pores and second pores, thus the water flux and rejection rate of a membrane including the hybrid porous structure are highly improved. Further, the hybrid porous structure still maintains a relatively high mechanical strength due to the presence of the non-porous matrix.

Hereinafter, the non-limiting embodiments are illustrated in more detail with reference to various examples. However, the following are example embodiments and are not limiting.

EXAMPLE

Preparative Example 1: Preparation of Polystyrene Colloidal Particles

Emulsion polymerization is employed for synthesizing polystyrene (PS) colloidal particles. First, 25 ml of ethanol and 0.01 g of polyvinyl pyrrolidone are added in a beaker and stirred for several minutes. 3 ml of distilled water and 0.0065 g of ammonium persulfate (APS) are added into another beaker and stirred for several minutes. After then, the two solutions were combined. Then, 2.2 ml of styrene monomer is added to the combined solution and reacted for 12 hours at 70° C. After the reaction ends, centrifugation at 11,000 rpm and sonification in ethanol are each performed three times to remove unreacted materials, such as PVP, or impurities in the reactants are removed.

Preparative Example 2: Preparation of Inverse Opal Porous Matrix

An opal structure of a relatively highly crystallized lattice shape is formed by sedimentation using polystyrene nanoparticles of a size of 600 nm prepared in Preparative Example 1. Polyurethaneacrylate (PUA) is injected into the opal structure by spin coating (1000 rpm, 5 min.). To manufacture a free-standing thin film shape with both sides of the inverse-opal structure thin film open, polyurethaneacrylate that exists on the surface in an excessive amount is removed by spin coating (1000 rpm, 30 sec.) of ethanol (30 v/v % distilled water), and the surface is planarized. Subsequently, a polyurethaneacrylate matrix of an inverse-opal structure is manufactured through curing for 30 minutes under an ultraviolet (UV) exposure condition, and then inner polystyrene is removed by supporting in toluene for 2 hours.

Preparative Example 3: Preparation of Block Copolymer

A polystyrene-polymethylmethacrylate block copolymer (PS-b-PMMA) is prepared by anion polymerization using styrene and methylmethacrylate monomers in tetrahydrofuran (THF) solvent. Under argon atmosphere, the polymerization reaction using sec-butyllithium as an initiator is performed. The number average molecular weight is confirmed as 86-88 kg/mol (PDI<1.06), and the volume fraction of PMMA is adjusted between 0.20 to 0.28.

Example 1: Preparation of Hybrid Porous Structure

A thin membrane of block copolymer is prepared by injecting 7 wt % solution of PS-b-PMMA block copolymer (PS volume fraction=80%) into the inverse opal non-porous matrix prepared in Example 2, gasifying solvent to form a block copolymer thin film inside, and conducting heat treatment at 170° C. for 24 hours under vacuum to induce nanophase separation of the cylinder shape. Subsequently, the polymethylmethacrylate (PMMA) chain is decomposed through ultraviolet (UV) light irradiation under vacuum for 5 hours, and then the decomposed polymethylmethacrylate is eluted using acetic acid to form a porous region including nanopores, thereby preparing a hybrid porous structured material in which block copolymer nanopore structure is prepared in an inverse opal non-porous matrix.

FIG. 8 is a scanning electron microscope (SEM) photograph of a cross-section of a hybrid porous structure according to Example 1. As shown from FIG. 8, the nanopore structures are usually present on the portions at which the spherical pores are connected in the inverse opal non-porous matrix, upon using 7 wt % of block copolymer solution to prepare the nanopore structures.

Example 2: Preparation of Hybrid Porous Structure

A hybrid porous structures is prepared in the same manner as in Example 1, except for using 10 wt % solution of PS-b-PMMA block copolymer (PS volume fraction=80%) prepared in Preparative Example 3. FIG. 9 is a scanning electron microscope (SEM) photograph of a cross-section of a hybrid porous structured material prepared in Example 2, in which the porous material including the second pores is coated on the inside surface of the first pores.

Example 3: Preparation of Hybrid Porous Structure

A hybrid porous structures is prepared in the same manner as in Example 1, except for using 14 wt % solution of PS-b-PMMA block copolymer (PS volume fraction=80%) prepared in Preparative Example 3.

Example 4: Preparation of Hybrid Porous Structure

A hybrid porous structures is prepared in the same manner as in Example 1, except for using 7 wt % solution of PS-b-PMMA block copolymer (PS volume fraction=72%) prepared in Preparative Example 3.

Preparative Example 4: Preparation of Separation Membrane

A support layer (0.45 μm) of cellulose acetate (CA) is bonded to the hybrid porous structures (15 μm) prepared in Examples 1 to 4 and fixed to the stirred cell to manufacture a separation membrane of an ultrafiltration (UF) membrane.

Experimental Example 1: Evaluation of Membrane Performance (1) Evaluation of Water Flux To evaluate membrane performance of the membranes manufactured in Preparative Example 4, a feed solution is passed and the degree of purification is evaluated.

As the feed solution, an aqueous solution of 0.1 wt % silica nanoparticles (30 nm) is prepared. The silica nanoparticles are synthesized as follows.

1.5 ml of ammonium hydroxide and 0.5 ml of distilled water are added to 23 ml of ethanol, and they are mixed (solution A). In another container, 2 ml of tetraethylorthosilicate (TEOS) is mixed with 3 ml of ethanol (solution B). Then, while agitating solution A, solution B is dropped using a spoid, and they are mixed. After agitating for 1 hour, the mixture is sonicated for 10 minutes using an ultrasonicator, and then nanoparticles are precipitated on the lower layer and concentrated using a centrifuge (5000 rpm, 10 min.), and the supernatant is removed. The concentrate is then redispersed using ethanol with an ultrasonicator, and then a concentration process with a centrifuge is repeated several times to prepare silica nanoparticles.

To evaluate membrane performance, an aqueous solution of 0.1 wt % silica nanoparticles (30 nm) is prepared using the prepared silica nanoparticles.

While injecting the aqueous solution of 0.1 wt % silica nanoparticles (30 nm) at a speed of 0.3 ml per minute using a syringe pump that pushes at a constant pressure of 9 kg/cm2, the separation characteristic of each membrane manufactured in Example 2 and Comparative Example 1 is confirmed and a treated water solution is obtained.

The effective membrane are of the stirred cell in Preparative Example 4 is 4.1 cm². In order to evaluate water flux, nitrogen gas ($N_2$) is used as a pressure source, and volume is measured upon time to determine the water flux. Water flux is calculated by following Equation 1:

$$F=V/(A*t)$$

In Equation 1, V indicates the flux, A indicates the membrane area, and t indicates time.

The Water flux of the membranes prepared from the hybrid porous structures of Examples 1 to 3 are indicated in Table 1.

TABLE 1

| | Example 1 | Example 2 | Example 3 |
|---|---|---|---|
| Flux | 2,000 LMH | 700 LMH | Less than 100 LMH |

Meanwhile, the water flux changes upon increasing pressures are described in FIG. 10.

As shown in Table 1, the membrane including a hybrid porous structure prepared in Example 1 using a solution containing 7 wt % of polystyrene-polymethacrylate block copolymer (PS-b-PMMA), the water flux is about 2000 LMH, which is much higher than those prepared using 10 wt % or 14 wt % of polystyrene-polymethacrylate block copolymer.

Further, as shown from FIG. 10, a membrane including the hybrid porous structure prepared in Example 1, the water flux increases faster than those prepared in Example 2 or Example 3, and at a higher pressure, i.e., at 2.5 bar, the mechanical strength of the membrane is also sufficient. Specifically, when the pressure increases to greater than 2.5 bar, water flux increases to greater than 3,000 LMH.

Meanwhile, the membrane including the hybrid porous structure of Example 3 shows little increase in water flux upon increasing pressure, and less than 500 LMH at greater than 2.5 bar. The membrane including the hybrid porous structure of Example 2 does not high increase in water flux when increasing pressure either, but shows about 1,000 LMH at greater than 2.5 bar, which is similar with the commercial ultrafiltration membranes.

(2) Evaluation of Rejection Rate

To evaluate rejection rate of impurities, gold (Au) particles are prepared in diameters of 5, 10, 20, and 30 nms, and are tested under 1 bar. The concentrations of the feed solutions and the treated solutions are measured by UV-vis spectroscopy.

For evaluation, membranes including the hybrid porous structures prepared in Examples 1 and 4 are used. In the hybrid porous structure prepared in Example 1, the volume ratio of the block copolymer PMMA is 20%, and the size of the pores prepared by the block copolymer is about 16 nm. Meanwhile, in the hybrid porous structure prepared by Example 4, the volume ratio of the block copolymer PMMA is 28%, and the size of the pores prepared by the block copolymer is about 22 nm.

The rejection rate of the membranes for Au particles is indicated in Table 2.

TABLE 2

|  | Rejection Rate (%)/Au diameter | | | |
| --- | --- | --- | --- | --- |
|  | 5 | 10 | 20 | 30 |
| Example 1 (pore size: 16 nm) | 30 | 77 | 100 | 100 |
| Example 4 (pore size: 22 nm) | 25 | 68 | 89 | 100 |

As shown from Table 2, the membrane according to an example embodiment can control with relative ease the pore size in the hybrid porous structure by adjusting the ratio of the polymers contained in the block copolymer, thus the rejection rate for materials to be separated can drastically improve.

While this disclosure has been described in connection with various example embodiments, it is to be understood that the disclosure is not limited to the disclosed embodiments, but, on the contrary, is intended to cover a variety of modifications and equivalent arrangements included within the spirit and scope of the appended claims.

What is claimed is:

1. A membrane including a hybrid porous structured material, the hybrid porous structured material comprising:
    a matrix defining a plurality of first pores therein, the plurality of first pores being spherically shaped and overlapping so as to be interconnected in three dimensions, the matrix including a non-porous material selected from a curable resin, and
    a porous material including a plurality of second pores, the porous material being present only on portions through which the plurality of first pores are interconnected, the porous material including a self-assembling block copolymer, the plurality of second pores being nanopores resulting from a partial or complete removal of a polymer that forms at least one block of the self-assembling block copolymer.

2. The membrane according to claim 1, wherein the self-assembling block copolymer is selected from polystyrene-polymethyl methacrylate block copolymer (PS-b-PMMA), polystyrene-polybutadiene block copolymer (PS-b-PB), polystyrene-polyethylene oxide block copolymer (PS-b-PEO), polystyrene-polyvinylpyridine block copolymer (PS-b-PVP), polystyrene-polyethylene-alt-propylene block copolymer (PS-b-PEP), polystyrene-polyisophrene block copolymer (PS-b-PI), and a combination thereof.

3. The membrane according to claim 1, wherein the plurality of first pores have an average diameter of about 5 nm to about 100 μm.

4. The membrane according to claim 1, wherein the plurality of second pores have an average diameter of about 1 nm to about 100 nm.

5. The membrane according to claim 1, wherein the hybrid porous structured material has a thickness and two surfaces facing in opposite directions, an area occupied by exposed portions of the porous material in each of the two surfaces being about 5 to about 99% of a total area of each of the two surfaces.

6. The membrane according to claim 5 wherein the thickness is about 10 nm to about 1000 μm.

7. A composite membrane comprising:
    the membrane according to claim 1; and
    a support layer.

8. A method of preparing a hybrid porous structured material, comprising:
    stacking a plurality of spherical body particles such that the plurality of spherical body particles contact each other in three dimensions with gaps between non-contacting surfaces of the plurality of spherical body particles;
    injecting a liquid phase material so as to fill the gaps between the non-contacting surfaces of the plurality of spherical body particles;
    curing the liquid phase material to form a non-porous region of a matrix;
    dissolving the plurality of spherical body particles to form a plurality of first pores within the matrix, the plurality of first pores surrounded by the non-porous region and previously occupied by the plurality of spherical body particles;
    injecting a self-assembling block copolymer including at least two polymers connected by a covalent bond into the plurality of first pores in the matrix; and
    eluting a polymer that forms at least one block of the self-assembling block copolymer to form a porous material being present only on portions through which the plurality of first pores are interconnected, the porous material including a plurality of second pores.

9. The method of preparing a hybrid porous structured material according to claim 8 wherein the stacking includes stacking the plurality of spherical body particles in a closest packing structure.

10. The method of preparing a hybrid porous structured material according to claim 8 wherein the stacking includes using colloidal particles as the plurality of spherical body particles.

11. The method of preparing a hybrid porous structured material according to claim 8 wherein the injecting a self-assembling block copolymer and the eluting includes adjusting a relative ratio of the at least two polymers to control the size of the plurality of second pores in the porous material.

* * * * *